US011057521B2

(12) United States Patent
Cermak et al.

(10) Patent No.: US 11,057,521 B2
(45) Date of Patent: Jul. 6, 2021

(54) SYSTEM AND METHOD FOR PROVIDING A TELEMATICS SERVICE USING THIRD-PARTY AUTHENTICATION

(71) Applicant: GM Global Technology Operations LLC, Detroit, MI (US)

(72) Inventors: Alexander X. Cermak, Grosse Pointe Woods, MI (US); Erica L. Burris, Waterford, MI (US); Deborah B. Carlini, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 16/186,660

(22) Filed: Nov. 12, 2018

(65) Prior Publication Data
US 2020/0153967 A1 May 14, 2020

(51) Int. Cl.
| | |
|---|---|
| *H04M 3/51* | (2006.01) |
| *H04L 29/06* | (2006.01) |
| *G06F 21/45* | (2013.01) |
| *H04W 12/06* | (2021.01) |
| *G06Q 10/02* | (2012.01) |
| *H04L 29/08* | (2006.01) |
| *H04W 4/024* | (2018.01) |
| *G01C 21/36* | (2006.01) |

(52) U.S. Cl.
CPC ........ *H04M 3/5191* (2013.01); *G01C 21/362* (2013.01); *G06F 21/45* (2013.01); *G06Q 10/02* (2013.01); *H04L 63/083* (2013.01); *H04L 67/10* (2013.01); *H04L 67/125* (2013.01); *H04W 4/024* (2018.02); *H04W 12/06* (2013.01); *G06F 2221/2115* (2013.01); *G06F 2221/2137* (2013.01)

(58) Field of Classification Search
CPC ...... G06F 21/44–45; G06F 2221/2115; H04W 12/06; G01C 21/362; H04L 63/083; H04M 3/5191
USPC ..................................... 379/265.09
See application file for complete search history.

(56) References Cited

U.S. PATENT DOCUMENTS

| | | |
|---|---|---|
| 7,174,153 B2 | 2/2007 | Ehlers |
| 9,264,419 B1 * | 2/2016 | Johansson ............. H04L 9/3278 |
| 2004/0190693 A1 | 9/2004 | Beiermeister |

(Continued)

*Primary Examiner* — Ahmad F. Matar
*Assistant Examiner* — Jirapon Intavong
(74) *Attorney, Agent, or Firm* — Vivacqua Crane

(57) ABSTRACT

A system and method for providing a telematics service using a third-party authentication is provided. The system and method include receiving a request for navigation instructions, by a call center, from a client using a telematics system. The call center then inquires if the client requires concierge services. If the client does not require concierge services then the call center initiates download of the navigation instructions. If the client does require concierge services then the call center provides the client with a randomly generated password and transfers the client to a third-party service provider. The third-party service provider then obtains the password from the client and enters the password to a cloud-based application for authentication to retrieve a set of client information for providing the concierge service, request a PIN from the client, and enters the PIN into the cloud-based application to initiate download of the navigation instructions.

16 Claims, 3 Drawing Sheets

(56) References Cited

U.S. PATENT DOCUMENTS

| | | | |
|---|---|---|---|
| 2004/0240655 A1* | 12/2004 | Swick | H04M 3/4931 |
| | | | 379/218.01 |
| 2005/0144462 A1* | 6/2005 | LaGarde | G06F 21/46 |
| | | | 713/184 |
| 2006/0046740 A1 | 3/2006 | Johnson | |
| 2012/0253551 A1* | 10/2012 | Halimi | H04M 3/4878 |
| | | | 701/1 |
| 2018/0189566 A1 | 7/2018 | Grimm et al. | |

* cited by examiner

SYSTEM AND METHOD FOR PROVIDING A TELEMATICS SERVICE USING THIRD-PARTY AUTHENTICATION

INTRODUCTION

The present disclosure relates to a method and system for providing user selected telematics services, and more particularly to a method and system for providing telematics services using third-party authentication.

An occupant of a motor vehicle may require information concerning weather, traffic, flight schedules, directions, entertainment, local accommodation, and the likes to ensure an enjoyable travel. Modern vehicles having onboard telematics systems that include a wireless communication system and an automotive navigation system may participate in subscription-based services, offered by telematics service providers, beyond the basic roadside assistance service. Such subscription-based services may include in-vehicle security, emergency response, hands-free calling, turn-by-turn navigation, remote diagnostics, and concierge services. Examples of concierge services include, but are not limited to, obtaining and providing information on a particular destination and making arrangements for goods and/or services at the particular destinations, such as making reservations for a hotel room or booking airline tickets.

Concierge services can be especially convenient, especially when combined with turn-by-turn navigation directions, in the cases of rental vehicles where the client, also referred to as a user, might not be familiar with his or her surroundings, or when the user is traveling to a non-familiar destination. The user may contact a call center of a provider of the subscription-based services to inquire about the availability of goods and/or services at the destination and to request directions to the providers of the goods and/or services.

The provider of the subscription-base service may enter into an arrangement with a third-party supplier in order to provide a broader range of concierge services available to the user. For example, the user may contact the call center and inquire about the availability of hotel rooms at a particular destination and directions to the hotel selected by the user. The call center may transfer the user to a third-party hotel reservation service in order to provide the user with a comprehensive selection of preferred hotels. Once the user makes a hotel reservation and the user desires directions to the hotel downloaded to the vehicle's telematics system, the user would be required to contact the call center again to download the directions.

Thus, while the current method of offering concierge services together with downloaded directions to the user achieve their intended purpose, there is a need to improve the ease of use to improved user satisfaction and to improve the efficiency for providing concierge services together with downloaded directions to the user.

SUMMARY

According to several aspects, a method of providing a telematics service using a third-party authentication is disclosed. The method includes receiving a telematics service request, by a call center, from a client using an onboard telematics system; generating a password, by the call center, and providing the password to the client; transferring the client, by the call center, to a third-party service provider; requesting the password, by the third-party service provider, from the client; and entering the password for authentication, by the third-party service provider, to a cloud-based application in order to access a set of client information from a database.

In an additional aspect of the present disclosure, the telematics service request from the client includes navigation instructions to a destination; and the third-party service provider initiates an application programming interface (API), by-way of the cloud-based application, configured to instruct a navigation subsystem to download the navigation instructions to the onboard telematics system.

In another aspect of the present disclosure, the method further includes obtaining permission, by the call center, from the client to be transferred to the third-party service provider before transferring the client to the third-party service provider; and initiating, by the call center, the download of the navigation instructions from the navigation subsystem if the client does not grant the permission to be transferred to the third-party service provider.

In another aspect of the present disclosure, the step of generating a password includes generating a random password based on a word from an English dictionary.

In another aspect of the present disclosure, the password is valid for a predetermined length of time from a time when the password is generated.

In another aspect of the present disclosure, the step of generating a password includes uploading the password to the cloud-based application for authentication by the third-party service provider to enable access to the set of client information.

In another aspect of the present disclosure, the cloud-based application is a whitelisted web-page.

In another aspect of the present disclosure, the cloud-based application includes a look-up table associated with the password, wherein the look-up table includes a user vehicle identification number, a user subscription eligibility, and a user personal identification number (PIN).

In another aspect of the present disclosure, the method further includes requesting, by the third-party service provider, the PIN from the client; and matching, by the third-party service provider, the PIN from the client with the PIN in the look-up table before initiation of the API to download the navigation instructions to the onboard telematics system.

In another aspect of the present disclosure, the third-party service provider provides concierge services including at least one of a hotel reservation, a vehicle reservation, and a ticket reservation.

According to several aspects, a communication system for providing a telematics service using a third-party authentication is disclosed. The system includes a vehicle having a telematics system comprising a telematics module having a navigation unit; a navigation subsystem configured to selectively wirelessly deliver navigation directions to the telematics module; a cloud-base application having an application programing interface (API) that is configured to selectively instruct the navigation subsystem to deliver the navigation directions to the telematics module; and a third-party service provider having access to the cloud-base application to initiate the API to instruct the navigation subsystem to deliver the navigation directions.

In an additional aspect of the present disclosure, the system further including a call center having at least one database containing a set of client information accessible by the cloud-based application. The cloud-based application includes a webpage configured to accept an entry, by the third-party provider, of a password for authentication to acquire access to the set of client information.

In another aspect of the present disclosure, the call center includes a telecommunication computer configured to randomly generate the password and to upload the password to the cloud-based application for authentication by the third-party provider.

In another aspect of the present disclosure, the webpage is further configured to accept an entry, by the third-party provider, of a personal identification number (PIN) to initiate the API to instruct the navigation subsystem to deliver the navigation directions.

In another aspect of the present disclosure, the third-party provider is a web-based third-provider service provider that provides concierge services including at least one of a hotel reservation, a ticket reservation, and a vehicle reservation.

According to several aspects, a method for using a telematics system for providing a concierge service and download of navigation instructions is disclosed. The method includes receiving a request for navigation instructions, by a call center, from a client using a telematics system and inquiring, by the call center, if the client requires concierge services. If the client does not require concierge services then the call center initiates download of the navigation instructions from a navigation subsystem to the telematics system. If the client does require concierge services then: the call center provides the client with a randomly generated password and transfers the client to a third-party service provider, the third-party service provider obtains the password from the client and enters the password to a cloud-based application for authentication to retrieve a set of client information for providing the concierge service, the third-party service provider request a personal identification number (PIN) from the client, and the third-party enters the PIN into the cloud-based application to initiate an application programming interface (API) to instruct the navigation subsystem to download the navigation instructions to the telematics system.

In an additional aspect of the present disclosure, the method further includes obtaining permission, by the call center, from the client before transferring the client to the third-party service provider.

In another aspect of the present disclosure, the randomly generated password is a word from an English dictionary.

In another aspect of the present disclosure, the randomly generated password has a limited time validity of less than 20 minutes.

In another aspect of the present disclosure, the cloud-based application is a whitelisted webpage.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
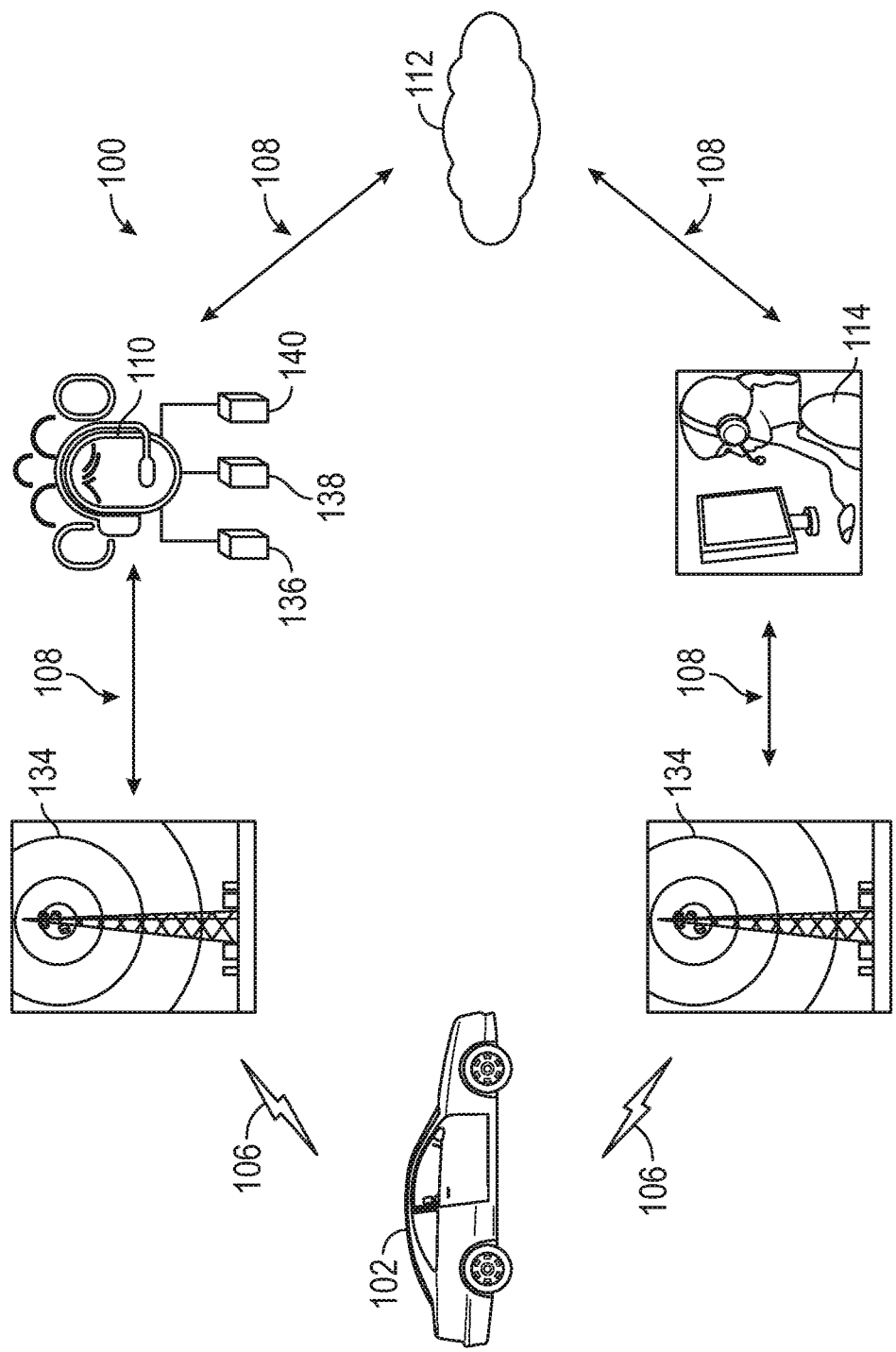
FIG. 1 is a schematic illustration of a communications system for providing a telematics service using a third-party authentication, according to an exemplary embodiment.

FIG. 1 shows a non-limiting example of a communication system, generally indicated with reference numeral 100, for providing a telematics service using third-party authentication. The communication system 100 generally includes a motor vehicle 102 having an onboard telematics system 104 (best shown in FIG. 2), a wireless carrier system 106, a land network 108, a service provider call center 110, a web-based service application 112 (also referred to as a cloud-based service application 112), and a third-party service provider 114, which may be a web-based third-party service provider 114. It should be appreciated that the overall architecture, setup and operation, as well as the individual components of the illustrated communication system 100 are merely exemplary and that differently configured communication systems may also be utilized to implement the example of the method 200 disclosed herein.

Figure 2:
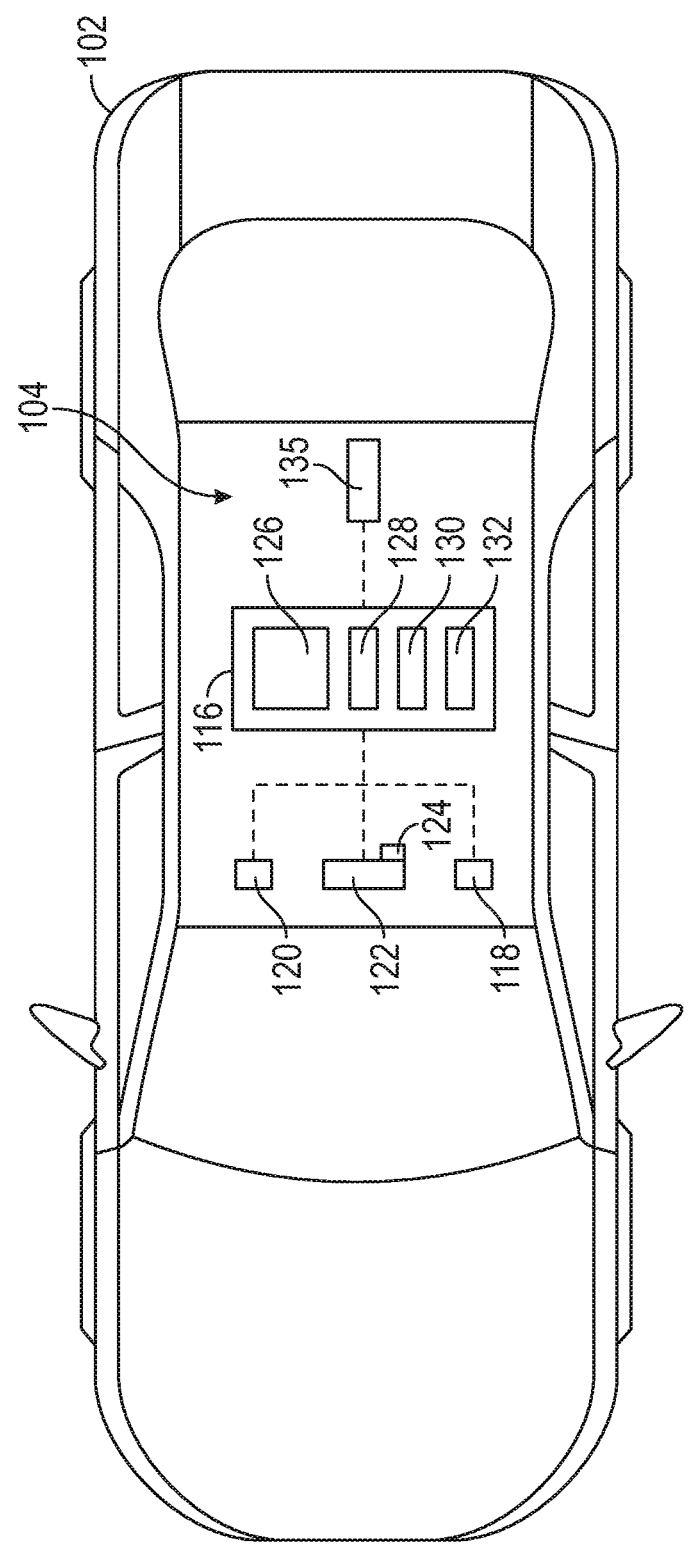
FIG. 2 is a schematic illustration of a motor vehicle having a telematics system, according to an exemplary embodiment.

With reference to FIG. 2, is schematic illustration of the motor vehicle 102 having the on-board telematics system 104. The motor vehicle 102 may be may be any type of land based mobile vehicle such as a motorcycle, car, truck, recreational vehicle (RV), or sport utility vehicle (SUV) that is equipped with suitable hardware and software that enables it to communicate over the communication system 100. The motor vehicle 102 may also be that of a water-based vehicle or air-based vehicle without departing from the scope of the invention.

The vehicle onboard telematics system 104 includes a telematics module 116, a microphone 118, a speaker 120, and a human machine interface (HMI) 122, such as a touch screen and/or buttons 124 electronically connected to the telematics module 116. The telematics module 116 generally includes an electronic processing device 126, one or more types of electronic memory 128, a wireless cellular chipset 130, and a navigation unit 132. A dual mode antenna 135 is provided on the vehicle 102 for servicing the wireless cellular chipset 130 and navigation unit 132. The electronic memory 128 contains software applications implemented by the electronic processing device 126 that operates the telematics system 104, including voice and data communications using the communication system 100. The software applications may include instructions to activate certain features of the onboard telematics system 104 by a verbal command of the user. While the electronic processing device 126, electronic memory 128, wireless cellular chipset 130, and navigation unit 132 are shown within a single module 116, it should be appreciated that the components may be disposed within several modules located in varying locations within the vehicle 102 without departing from the scope of the invention.

The on-board telematics system 104 is configured to provide various functions including wirelessly receiving turn-by-turn directions and other navigation-related services provided in conjunction with the navigation unit 132. The on-board telematics system 104 may use radio transmissions to establish a voice channel with the wireless carrier system 106 so that both voice and data transmissions can be sent and received over the voice channel. Vehicle communications with the call center 110 and third-party service provider 114 are enabled via the cellular chipset 130 for voice communications and data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

The microphone 118 provides the user, whether it is the driver or other vehicle occupant, with a means for inputting verbal or other auditory commands, and can be equipped with an embedded voice processing unit (VPU) utilizing a human/machine interface (HMI) technology. The speaker 120 provides audible output to the vehicle occupants including the user and can be either a stand-alone speaker specifically dedicated for use with the telematics module 116 or can be part of a vehicle infotainment system (not shown). In either event, the microphone 118 and speaker 120 enable the call center 110 and third-party service provider 114 to communicate with the user through audible speech. For example, one of the buttons 124 and/or controls can be an electronic pushbutton used to initiate voice communication with the call center.

Referring back to FIG. 1, the wireless carrier system 106 may include a cellular telephone system or any other suitable wireless system that transmits signals between the onboard telematics module 116 and land network 108. According to an example, the wireless carrier system includes one or more cell towers 134. The land network 108 may be that of a conventional land-based telecommunications network 108 that is connected to one or more landline telephones, and that connects the wireless carrier system 106 to the call center 110. For example, the land network 108 can include a public switched telephone network (PSTN) and/or an Internet protocol (IP) network. One or more segments of the land network 108 can be implemented in the form of a standard wired network, a fiber or other optical network, a cable network, other wireless networks such as wireless local networks (WLANs) or networks providing broadband wireless.

The call center 110 is designed to provide the telematics module 116 with a number of different system functions and services. While only one call center 110 is depicted, the subscription-based service provider may have a plurality of call centers 110 dispersed throughout a geographical region. According to the example shown here, the call center 110 generally includes advisors and one or more databases 136, as well as a variety of telecommunication computer 138. The databases are used to store the subscribers' information, including but not limited to user identification, user preferences, user account personal identification number (PIN), user vehicle identification number (VIN), and user eligible services based on a subscription basis. In one embodiment, an eligible service may include the call center 110 providing navigation and direction services that are wirelessly downloadable to the onboard telematics module 116. The call center 110 may use a navigation subsystem 140 that coordinates with the databases 136 and telecommunication computer 138 to download the navigation directions to the user's telematics module 116.

The databases 136 and navigation subsystem 140 may be housed at the location of the call center 110 or in a share pool of configurable computer system resources manageable over the internet, which is also referred to as cloud computing or the cloud. The databases 136, telecommunication computer 138, and navigation subsystem 140 may be accessible by the third-party service provider 114 by-way of the web-based service application 112, or cloud-based application 112, granting access to the user account information. The cloud-based application 112 may be that of a whitelisted website or webpage 112 in which only pre-approved third-party service providers 114 are authorized or have privileged to access. The whitelisted website or webpage may initiate an application programming interface (API) that is configured to download information stored in the databases and navigation subsystems to the user's telematics system 104 using the telecommunication computers 138.

The third-party provider 114 may be a web-based provider of goods and/or services. An example of such a web-based third-party service provider 114 may be that of travel agents and/or dedicated online reservation services, travel fare aggregators, and/or operators of travel metasearch engines. Examples of such web-based third-party service provider 114 includes Priceline®, Hotels.com®, Expedia.com® and the likes.

The third-party service provider 114 may access the user's information using the whitelisted website or webpage 112, including the preferences of the user, and push subscription services to the user, such as downloading navigation instructions to the user's navigation module. The whitelist webpage may require validating data to verify and/or validate that login attempts by the third-party service provider 114 are secure. The validating data may include a username of the third-party service provider 114 and account password as well as time limited information provided by the client or user of the on-board telematics system 104. An example of a time limited information is that of a user provided password that expires after a predetermined amount of time has elapsed.

Figure 3:
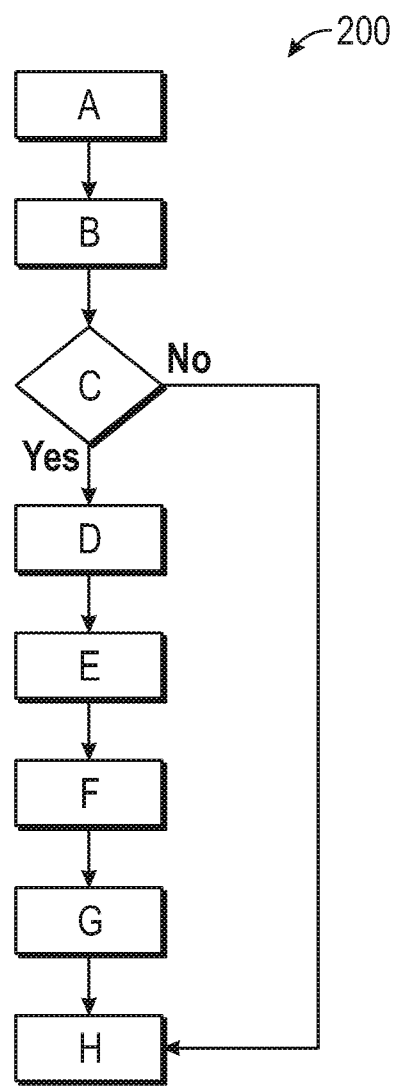
FIG. 3 is flow chart of a method for a third-party service provider initiating client authentication and vehicle navigation download.

Referring to FIG. 3 is a flow chart of a method, generally indicated by reference numeral 200, for providing a concierge service where the third-party service provider 114 initiates authentication and vehicle navigation download using the communication system 100 of FIG. 1. The third-party service provider 114 accesses the user's information and push subscription services, such as downloading of navigation instructions, using the whitelisted website or webpage 112.

The method 200 begins in block A, where a request for a concierge service and/or navigation directions is initiated by the user pressing a button of the onboard telematics system 104 or verbally speaking the request. In one embodiment, the button 124 on the HMI 122 in the motor vehicle 102 may be pressed to activate the telematics module 116 to contact the call center 110. This button depress alerts the telematics module 116 to notifying the call center 110 that a service request sequence has been initiated. In another embodiment, the user may verbally alert the telemetric module 116, by vocalizing a predetermined word or phrase, to receive the request.

In block B, an advisor from the call center 110 receives the request from the user for a concierge service and/or driving directions. In Block C, the advisor inquire if the user would agree to be transfer to a third-party service provider 114 that may be in a better position to provide the concierge service requested by the user.

In Block C, if the user does not agree, then the method jumps to Block H where the advisor may obtain a verbal authorization and PIN from the user to initiate delivery of the navigation instructions to the telematics module 116 of the user's vehicle 102.

In Block D, if the user agrees to be transfer to the third-party provider 114, then the advisor generates a random password, based on a dictionary word such as "bunny", and provides the user with the password. The randomly generated password may be generated by the telecommunication computer 138 at the call center 110 and uploaded to the web-based application 112, or generated by the web-based application 112. The password may have a time limit before becoming invalid.

In Block E after providing the user with the password, the advisor transfers the user to the third-party service provider 114. In Block F, the third-party service provider 114 request the password from the user, and enter the password into the web-based application 112, i.e. whitelisted web page, to retrieve the user information. The password may be used within a look-up-table that includes the VIN, subscription eligibility, and user PIN. The password may also have a limited time such as 15 to 20 minutes before the password becomes invalid.

In Block G, the user may either agree to complete the transaction with the third-party service provider 114 by accepting the concierge service such as the making of a reservation for a hotel, or not complete the transaction with the third-party service provider 114 by not accepting the concierge service.

In Block H, if the user still requires the navigation instructions, the third-party service provider may obtain a verbal authorization and PIN from the user to initiate the API via the whitelisted webpage to deliver navigation instructions to the telematics module 116 of the user's vehicle 102.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing a telematics service using a third-party authentication, comprising:
   receiving a telematics service request, by a call center, from a client using a client onboard telematics system;
   generating a password, by the call center, and providing the password to the client;
   transferring the client, by the call center, to a third-party service provider, wherein the call center includes a call center database containing a set of client information and a call center navigation subsystem in selective communication with the client onboard telematics system;
   requesting the password, by the third-party service provider, from the client; and
   entering the password for authentication, by the third-party service provider, to a cloud-based application in order to access the set of client information from the call center database to access the call center navigation subsystem for providing the requested telematics service; and
   wherein the step of generating a password includes uploading the password to the cloud-based application for authentication by the third-party service provider to enable access to the set of client information.

2. The method of claim 1, wherein:
   the telematics service request from the client includes navigation instructions to a destination; and
   the third-party service provider initiates an application programming interface (API), by-way of the cloud-based application, configured to instruct the call center navigation subsystem to download the navigation instructions to the onboard telematics system.

3. The method of claim 2, further comprising:
   obtaining permission, by the call center, from the client to be transferred to the third-party service provider before transferring the client to the third-party service provider; and
   initiating, by the call center, the download of the navigation instructions from the navigation subsystem if the client does not grant the permission to be transferred to the third-party service provider.

4. The method of claim 3, wherein the step of generating a password includes generating a random password based on a word from an English dictionary.

5. The method of claim 4, wherein the password is valid for a predetermined length of time from a time when the password is generated.

6. The method of claim 2, wherein the cloud-based application is a whitelisted web-page.

7. The method of claim 6, wherein the whitelisted web-page includes a look-up table associated with the password, wherein the look-up table includes a user vehicle identification number, a user subscription eligibility, and a user personal identification number (PIN).

8. The method of claim 7, further comprising:
   requesting, by the third-party service provider, the PIN from the client; and
   matching, by the third-party service provider, the PIN from the client with the PIN in the look-up table before initiating the API to download the navigation instructions to the onboard telematics system.

9. The method of claim 8, wherein the third-party service provider provides concierge services including at least one of a hotel reservation, a vehicle reservation, and a ticket reservation.

10. A communication system for providing a telematics service using a third-party authentication, comprising:
    a vehicle having a telematics system comprising a telematics module having a navigation unit;
    a call center having at least one call center data base containing a set of client information accessible by a cloud-based application;
    a call center navigation subsystem configured to selectively wirelessly deliver navigation directions to the telematics module;
    the cloud-based application having an application programing interface (API) that is configured to selectively instruct the call center navigation subsystem to deliver the navigation directions to the telematics module; and
    a third-party service provider having access to the cloud-based application to initiate the API to instruct the call center navigation subsystem to deliver the navigation directions; and
    wherein the call center includes a call center telecommunication computer configured to generate a random password for a client and to upload the random password to the cloud-based application for authentication by the third-party provider, wherein the cloud-based application includes a webpage configured to accept an entry, by the third-party provider, of the random password obtained from the client for authentication to acquire access to the set of client information, and wherein the webpage is further configured to accept an entry, by the third-party provider, of a client personal identification number (PIN) obtained from the client to initiate the API to instruct the navigation subsystem to deliver the navigation directions.

11. The communication system of claim 10, wherein the third-party provider is a web-based third-provider service provider that provides concierge services including at least one of a hotel reservation, a ticket reservation, and a vehicle reservation.

12. A method for using a telematics system for providing a concierge service and a download of navigation instructions, comprising:

receiving a request for the navigation instructions, by a call center, from a client using the telematics system;

inquiring, by the call center, if the client requires concierge services;

(i) if the client does not require concierge services then the call center initiates download of the navigation instructions from a call center navigation subsystem to the telematics system; and (ii) if the client does require concierge services then:

the call center provides the client with a randomly generated password and transfers the client to a third-party service provider, the third-party service provider obtains the password from the client and enters the password to a cloud-based application for authentication to retrieve a set of client information from a call center database for providing the concierge service, the third-party service provider request a personal identification number (PIN) from the client, and the third-party service provider enters the PIN into the cloud-based application to initiate an application programing interface (API) to instruct the call center navigation subsystem to download the navigation instructions to the telematics system.

13. The method of claim 12, further comprising obtaining permission, by the call center, from the client before transferring the client to the third-party service provider.

14. The method of claim 12, wherein the randomly generated password is a word from an English dictionary.

15. The method of claim 12, wherein the randomly generated password has a limited time validity of less than 20 minutes.

16. The method of claim 12, wherein the cloud-based application is a whitelisted webpage.

* * * * *